United States Patent [19]

Nowak et al.

[11] Patent Number: 4,571,005

[45] Date of Patent: Feb. 18, 1986

[54] WHEEL, ESPECIALLY DISK WHEEL

[75] Inventors: Franz Nowak, Taufkirchen; Albert Gietl, Brannenburg; Rolf Leo, Wertingen; Gerhard Singer, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 680,277

[22] Filed: Dec. 10, 1984

[30] Foreign Application Priority Data

Dec. 16, 1983 [DE] Fed. Rep. of Germany ....... 3345555

[51] Int. Cl.$^4$ .............................................. B60B 1/06
[52] U.S. Cl. ...................... 301/63 PW; 301/63 DD; 295/23; 295/25; 295/30
[58] Field of Search ...................... 295/21, 23, 25, 28, 295/30; 301/63 PW, 63 DD, 105 S, 65, 105 R, 106

[56] References Cited

U.S. PATENT DOCUMENTS 3,862,779  1/1975  Jayne .............................. 301/63 DD
4,200,326  4/1980  Wilcox ................................. 295/23

FOREIGN PATENT DOCUMENTS 3119500  1/1983  Fed. Rep. of Germany .
3143845  5/1983  Fed. Rep. of Germany .

Primary Examiner—Robert B. Reeves
Assistant Examiner—Carol L. Olson
Attorney, Agent, or Firm—W. G. Fasse; D. H. Kane, Jr.

[57] ABSTRACT

A wheel, especially a disk wheel has six components, namely, two mirror-symmetrical hub sections, a wheel rim, two bending resistant wheel disks and a thrust and/or shear resistant body enclosed by the rim, by the two hub sections, and by the two wheel disks whereby metal components and fiber composite material components are bonded to one another to form the wheel. The materials of these components are selected for three purposes, to simplify the construction, to optimize the strength characteristics of the wheel, and to greatly increase the wheel's ability to dampen vibrations. The hub sections and rim are made of metal, the disks are made of fiber compound material and the enclosed body is made of metal or fiber compound material all held together by an adhesive bond. The hub sections have radially extending flanges which intermesh with the radially inner edge of the wheel disks in a multilayer fashion. The thrust and/or shear resistant body has preferably a honeycomb type structure.

9 Claims, 5 Drawing Figures

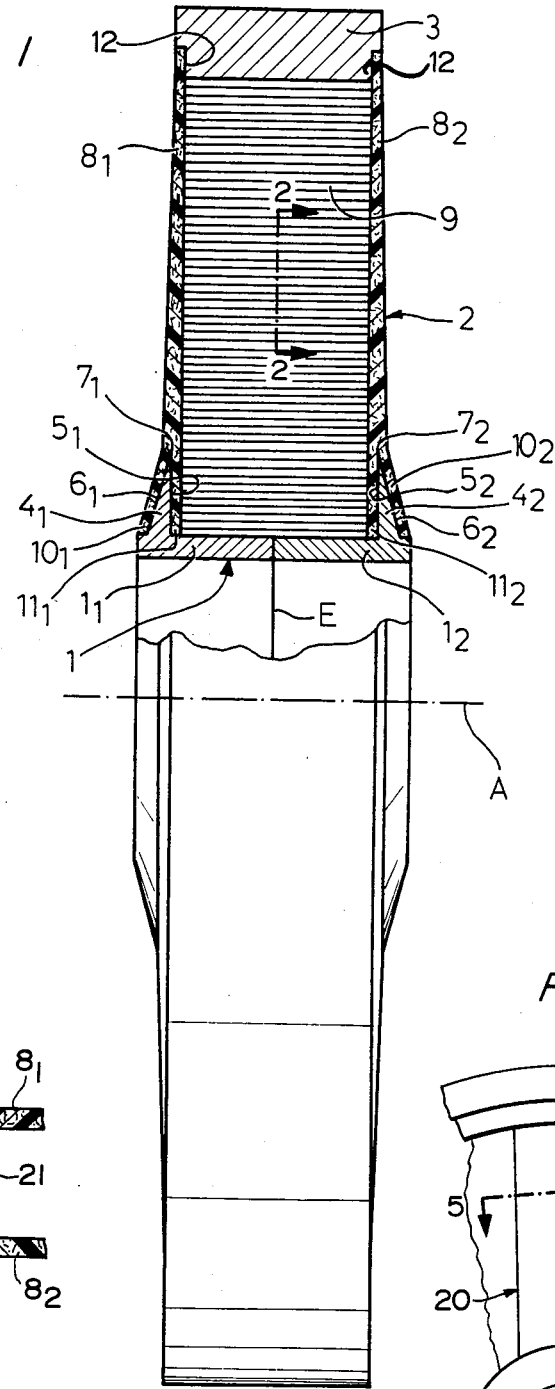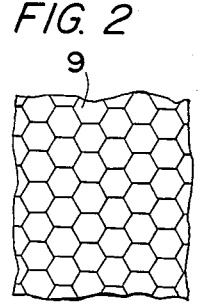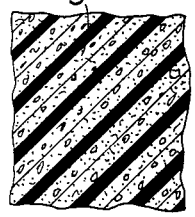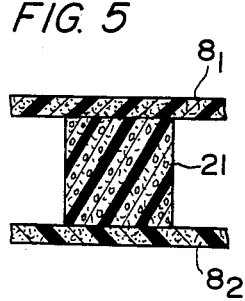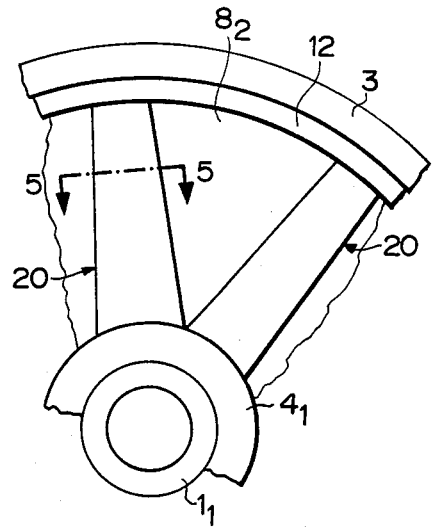

WHEEL, ESPECIALLY DISK WHEEL

FIELD OF THE INVENTION

The invention relates to a wheel having a hub with a rotational axis, a wheel rim, and bending resistant connecting means operatively interconnecting the wheel rim to the hub. The connecting means between the rim and the hub may comprise two disks.

DESCRIPTION OF THE PRIOR ART

Such wheels, especially disk wheels, for example railroad wheels or large diameter gear wheels, have been manufactured heretofore primarily as single piece structures made of isotropic materials. Such materials have the same characteristics in all directions of space and include especially metals. Such disk wheels, for example railroad wheels, are subject to loads effective in different directions during the operations of the wheel. These loads are caused by forces effective in the radial direction as well as in the axial direction and in the circumferential direction. Due to the mentioned isotropic characteristic of conventional materials used for manufacturing such wheels, it has not been possible heretofore to sufficiently adapt the strength and stiffness characteristics of the wheel to the corresponding strength and stiffness requirements imposed by such differentiated loads. Another disadvantage of prior art wheels is seen in that they are constructed as a single piece component which accordingly is relatively voluminous and hence heavy. Another drawback of prior art wheels of this type is seen in that there are practically no structural damping means so that, for example, metal railroad wheels constitute during their operation an intensive source of noise, especially in the range of higher frequencies. This type of noise nuisance can be reduced only in connection with prior art wheels by a substantial technological effort and expenditure.

German Patent Publication (DE-OS) No. 3,119,500 discloses a railroad disk wheel constructed as a composite device made of metal and fiber reinforced materials. The purpose of such a structure is to reduce the weight of the wheel and to lessen the nuisance caused by noise during the operation of such wheels. The disk wheel according to German Patent Publication No. 3,119,500 comprises a metallic hub and a metallic wheel rim as well as a bending stiff wheel disk made of fiber reinforced materials and interconnecting the hub with the rim. The wheel disk may comprise two individual disks which diverge along the edges toward the hub and toward the wheel rim. Incidentally, German Patent Publication No. 3,119,500 also suggests that the wheel hub as well as the wheel rim may also be made of fiber reinforced materials.

By connecting the wheel hub and the wheel rim through fiber reinforced materials it is possible to not only reduce the weight, but also to advantageously improve the vibration characteristics of such a wheel during the operation as compared to conventional single piece metallic disk wheels.

German Patent Publication (DE-OS) No. 3,143,845 discloses features which improve the operational vibration characteristics of such known disk wheels. For this purpose the wheel hub and the wheel rim are interconnected by spokes made of fiber reinforced materials, whereby the spokes are arranged in a star type configuration. The spokes are wound of fiber reinforced materials in a loop type formation. The number of the spokes is so determined and the winding of the spoke is so constructed that the lowest possible given "Eigenfrequency" of the disk wheel is damped. This type of disk wheel is especially suitable for use as a railroad wheel. Additionally, such a wheel is relatively lightweight and it generates a small operation noise and runs relatively quietly.

OBJECTS OF THE INVENTION

In view of the above it is the aim of the invention to achieve the following objects singly or in combination:

to construct a wheel disk of the type described above so that it has simpler structural features as compared to the prior art, whereby simultaneously it shall be assured that the strength and stiffness characteristics of the disk wheel are adapted to the respectively occurring load directions;

to further reduce the noise radiation of such disk wheels during their operation;

to damp the vibrations and oscillations in a more efficient manner;

to construct the wheel in such a way that a small number of components may preferably be bonded to one another by a suitable adhesive; and to improve the rolling characteristics of such wheels.

SUMMARY OF THE INVENTION

The wheel, especially a disk wheel according to the invention, is so constructed that the wheel hub is axially divided into two mirror symmetrical equal hub halves. Each hub half is provided on its axially outwardly facing edge with a circumferential flange. The bending resistant connecting means between the hub and the rim comprise preferably two disks which engage the respective flange in a double or multilayer fashion. A shear resistant body is located between the cover disks. The wheel rim and the wheel hub are connected to the cover disks as well as to the shear or thrust resistant body between the cover disks, preferably by an adhesive.

More specifically the cover disks have radially inwardly forked sections which embrace the respective circumferential flange of the corresponding hub half in a double layer fashion. The cover disks and the thrust or shearing resistant body are so bonded to each other that they form together the wheel disk proper. The wheel rim is directly connected to the two cover disks and to the thrust or shear resistant central body.

In the example embodiment of a railroad wheel the hub sections and the wheel rim are made of metal while the cover disks are made of fiber reinforced materials such as synthetic materials whereas the thrust or shear transmitting body between the cover disks is constructed as a shear resistant honeycomb type structure made of synthetic material or of aluminum.

A disk wheel according to the invention comprises but six individual components which are easily assembled to form the disk wheel and which are preferably bonded to each other by a suitable adhesive such as a foil adhesive (e.g. Redux 312 of CIBA Company), liquid adhesive or splice adhesive (e.g. FM37 of American Cyanamid Company).

The two cover disks of fiber reinforced materials form together with the thrust or shear transmitting body located between the disks a bending stiff plate, whereby the axial forces effective on the wheel rim are introduced directly into the two hub halves through the shear or thrust transmitting body. All radial forces and torsion forces occurring when the present disk wheel is under loud conditions are introduced into the wheel hub through the double layered connection between the cover disks and the wheel hub. The wheel hub or rather its two halves are manufactured conventionally, especially of metal when these hubs are intended for a railroad wheel because such an isotropic material is advantageous for the force locking or form locking connections between the wheel hub and a shaft or axle.

The suggested honeycomb type structure of the thrust or shear transmitting body between the cover disks has the advantage that it is lightweight and that it has a high bending and shear resistant stiffness, as well as a high vibration damping characteristic for frequencies in a low frequency range as well as frequencies in the audible acoustic range.

BRIEF DESCRIPTION OF THE DRAWINGS

In order that the invention may be clearly understood, it will now be described, by way of example, with reference to the accompanying drawings, wherein:

FIG. 1 is a side elevational view of a wheel structure according to the invention, whereby the viewing direction extends perpendicularly to the rotational axis of the wheel and whereby the upper portion is shown in section;

FIG. 2 is a sectional view along section line 2—2 in FIG. 1;

FIG. 3 is a similar view as FIG. 2, but showing a different material used for manufacturing the central thrust and shear transmitting body;

FIG. 4 is a view of a modified embodiment, whereby the viewing direction extends in the direction of the rotational axis and wherein the thrust transmitting body between the rim and the hub comprises a plurality of spoke type bodies; and FIG. 5 is a sectional view along section line 5—5 in FIG. 4.

DETAILED DESCRIPTION OF PREFERRED EXAMPLE EMBODIMENTS AND OF THE BEST MODE OF THE INVENTION

FIG. 1 shows the present wheel comprising a wheel hub 1 defining a rotational axis A and made as initially two separate hub halves $1_1$ and $1_2$. Both hub halves are made of metal and are mirror symmetrically arranged relative to a central radial plane E of the present disk wheel. The wheel further comprises a wheel disk 2 made of fiber composite material and a wheel rim 3 made of metal. The wheel rim 3 forms, for example, the tread of a railroad wheel. The wheel disk 2 operatively connects the wheel hub to the tread or rim 3 of the wheel.

Each hub half $1_1$ and $1_2$ is provided at its axially outer edge with a respective flange $4_1$ and $4_2$ having a substantially triangular cross-section as seen in the upper half of FIG. 1. Each flange has an axially inwardly facing surface $5_1$ and $5_2$ extending radially away from the hub 1. On the other hand, the axially outwardly facing surfaces $6_1$ and $6_2$ of the flanges extend at a slant relative to the radial direction to form an acute angle with the respective axially inwardly facing flange surface $5_1$, $5_2$ at the radially outer edge $7_1$, $7_2$ of the respective flange.

The wheel disk 2 comprises two cover disks $8_1$ and $8_2$ made of fiber reinforced materials and a thrust or shear transmitting body 9 located between the cover disks $8_1$, $8_2$. The cover disks $8_1$, $8_2$ are slotted or forked along their radially inner edge facing toward the respective hub flange $4_1$, $4_2$. Thus, the cover disk $8_1$ has two radially inner flaps $10_1$, $11_1$ and the cover disk $8_2$ has two radially inner flaps $10_2$ and $11_2$. The outer flaps $10_1$ and $10_2$ rest on the slanted surfaces of the hub flange, whereas the radially inner flaps $11_1$ and $11_2$ rest on the axially inner sides $5_1$, $5_2$ of the flange $4_1$, $4_2$. The flange surfaces are bonded to the inwardly facing surfaces of the respective flaps by a suitable adhesive such as the above-mentioned foil adhesive.

The thrust or shear transmitting body 9 comprises a honeycomb type body which is resistant against shearing stress essentially in the axial direction and which is made of synthetic material or aluminum. The horizontal lines are supposed to indicate the honeycomb structure which is shown in a somewhat enlarged sectional view in FIG. 2. The honeycomb structure is also adhesively bonded to the two cover disks $8_1$, $8_2$ by a foil adhesive and to both hub sections $1_1$, $1_2$ and to the wheel rim 3 by the above-mentioned splice adhesive.

The wheel rim 3 is provided with radially inwardly extending grooves 12 and the cover disks $8_1$, $8_2$ are radially longer than the shear transmitting body 9 so that there is an overlap where the cover disks $8_1$, $8_2$ are bonded to the rim 3 in the grooves 12. Again, the same bonding adhesive is used as mentioned above.

The cover disks $8_1$, $8_2$ together with the shearing stress transmitting body 9 form a plate which is stiff against bending, where by axially effective forces on the wheel rim 3 are transmitted as thrust or shearing stress directly to the two hub halves $1_1$, $1_2$. The double layers or rather double interface bonding between the surfaces of the flanges $4_1$, $4_2$ and the flaps $10_1$, $10_2$ and $11_1$, $11_2$ of the cover disks $8_1$, $8_2$ introduces radial forces and torsion loads into the divided wheel hub 1 when the wheel rotates. Due to the compound construction of the wheel disk 2 comprising the two cover disks $8_1$, $8_2$ of fiber composite material and the shearing stress transmitting body 9 having a honeycomb type structure made of aluminum or synthetic material, it is possible to construct the wheel in accordance with the load requirements to be satisfied by the wheel. More specifically, the strength and the stiffness or load resistance of the entire disk wheel may be adapted to the just mentioned load requirements with regard to the respective load directions. With these features it is possible to obtain optimal rolling characteristics of the disk wheel according to the invention.

FIG. 3 shows a sectional view through the shear transmitting body 9 when the latter is made of synthetic material which may even be a foam material, especially a synthetic hard foam.

FIG. 4 illustrates an embodiment in which the wheel disk comprises a plurality of spoke type elements 20 constructed as shown in FIG. 5 with a shear transmitting body 21 sandwiched between the cover disks $8_1$ and $8_2$. Cover disk $8_1$ is omitted in FIG. 4. The body 21 may be, for example, of aluminum, and also having a honeycomb structure as shown in FIG. 2. Similarly, the body 21 may be made of hard foam or the like.

Although the invention has been described with reference to specific example embodiments, it will be appreciated, that it is intended, to cover all modifications and equivalents within the scope of the appended claims.

What is claimed is:

1. In a wheel having a hub (1) with a rotational axis (A), a wheel rim (3) and bending resistant means (2) operatively interconnecting said wheel rim (3) to said hub (1), the improvement comprising two hub sections ($1_1$; $1_2$) which are substantially mirror symmetrical relative to a central radial plane through the wheel, each hub section ($1_1$; $1_2$) comprising respective substantially radially extending flange means ($4_1$; $4_2$) located at an axially outer end of the respective hub section ($1_1$; $1_2$), said bending resistant means (2) comprising first and second cover members ($8_1$; $8_2$) for transmitting substantially radially extending forces from said wheel rim (3) into said hub (4), said bending resistant means further comprising body means (9) rigidly enclosed between said first and second cover members, first adhesive bonding means operatively connecting said flange means ($4_1$; $4_2$) to the respective first and second cover members ($8_1$; $8_2$), second adhesive bonding means operatively connecting said first and second cover disks ($8_1$; $8_2$) to said wheel rim (3), third adhesive bonding means securing said body means (9) to said first and second cover members ($8_1$; $8_2$), to said hub sections ($1_1$; $1_2$), and to said wheel rim (3), said body means comprising a structure which is thrust resistant in the direction of said rotational axis for transmitting substantially axially extending forces into said hub, wherein said radially extending flange means of said hub sections have a substantially triangular cross-section with substantially axially facing surfaces ($6_1$; $6_2$; $5_1$; $5_2$) and a circumferential edge ($7_1$; $7_2$) pointing substantially radially outwardly, and wherein each of said first and second cover members has two flaps ($10_1$; $11_1$; $10_2$; $11_2$) reaching radially inwardly in a forked manner for hugging said substantially axially facing flange surfaces.

2. The wheel of claim 1, wherein said hub sections including said flange means and said rim are made of metal, wherein said first and second cover disks are ring disks made of fiber composite material, and wherein said body means is made of a material which is shear resistant and bending resistant, substantially in the direction of said rotational axis.

3. The wheel of claim 2, wherein said first and second cover members are two cover ring disks.

4. The wheel of claim 1, wherein said substantially axially facing surfaces ($5_1$; $5_2$; $6_1$; $6_2$) of each of said flange means have one surface ($5_1$; $5_2$) facing axially inwardly and extending at a right angle to said rotational axis (A) and a further surface ($6_1$; $6_2$) facing substantially axially outwardly and extending at a small acute angle to a radial direction.

5. The wheel of claim 1, wherein said thrust resistant structure of said body means (9) comprises a honeycomb type construction including channel members extending substantially in parallel to said rotational axis.

6. The wheel of claim 5, wherein said honeycomb type construction is made of synthetic material.

7. The wheel of claim 5, wherein said honeycomb type construction is made of aluminum.

8. The wheel of claim 5, wherein said honeycomb type construction is made of foam material.

9. The wheel of claim 1, wherein said bending resistant means for interconnecting said rim and said hub comprise a plurality of spoke type member, each spoke type member including a body substantially resistant to axial thrust between respective cover members, each individual spoke type member being capable of transmitting shear stress and bending stress.

* * * * *